(12) United States Patent
Dhar et al.

(10) Patent No.: US 11,216,325 B2
(45) Date of Patent: Jan. 4, 2022

(54) REDUCING CROSS TALK AMONG CONNECTOR PINS

(71) Applicant: Arista Networks, Inc., Santa Clara, CA (US)

(72) Inventors: Ankush Dhar, Santa Clara, CA (US); Harold Wang, Santa Clara, CA (US); Prasad Venugopal, Santa Clara, CA (US); Arul Ramalingam, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 283 days.

(21) Appl. No.: 16/457,600

(22) Filed: Jun. 28, 2019

(65) Prior Publication Data

US 2020/0409439 A1 Dec. 31, 2020

(51) Int. Cl.
*G06F 11/07* (2006.01)

(52) U.S. Cl.
CPC ........ *G06F 11/076* (2013.01); *G06F 11/0745* (2013.01); *G06F 11/0793* (2013.01)

(58) Field of Classification Search
CPC ............... G06F 11/0745; G06F 11/076; G06F 11/0793; G06F 11/221
USPC ............................................ 714/43, 56, 704
See application file for complete search history.

(56) References Cited

U.S. PATENT DOCUMENTS

| 6,076,175 A * | 6/2000 | Drost ..................... H04L 1/24 |
| | | 714/704 |
| 7,389,450 B2 * | 6/2008 | Fleischer-Reumann ................... |
| | | G01R 31/3016 |
| | | 714/704 |

* cited by examiner

*Primary Examiner* — Joseph R Kudirka
(74) *Attorney, Agent, or Firm* — Fountainhead Law Group P.C.

(57) ABSTRACT

Embodiments of the present disclosure provide a method and apparatus for reducing cross talk among pins in a connector. The apparatus may detect a bit error rate (BER) for each of a plurality of pins in a connector and compare the BER for each pin to a threshold BER. Responsive to determining that a set of pins among the plurality of pins each have a BER that is above the threshold BER, the apparatus may decrease the BER for each pin in the set of pins by selecting a subset of pins among the plurality of pins and adjusting operational characteristics of one or more of the subset of pins. The operational characteristics include a transmit power of the pin.

20 Claims, 8 Drawing Sheets

REDUCING CROSS TALK AMONG CONNECTOR PINS

BACKGROUND

Electronic devices (e.g., computing devices, network devices, etc.) may use various cards that include circuit boards and connectors. The connectors may be used to connect the cards to each other. For example, a network switch may have one or more fabric cards (e.g., a component of the network switch) that are coupled to one or more line cards (e.g., another component of the network switch) via one or more connectors. Each connector may have a plurality of pins, each of which act as a channel to transmit data between fabric cards and line cards.

SUMMARY

In some implementations, an apparatus is provided. The apparatus includes a connector having a plurality of pins, a memory and a processor. The processor is configured to detect a bit error rate (BER) for each of the pins in the connector and compare the BER for each pin to a threshold BER. Responsive to determining that a set of pins among the plurality of pins each have a BER that is above the threshold BER, the processor may decrease the BER of each pin in the set of pins by selecting a subset of pins among the plurality of pins and adjusting operational characteristics of one or more of the subset of pins, wherein the operational characteristics include a transmit power.

In some implementations, a non-transitory machine-readable medium is provided, the medium having executable instructions to cause one or more processing devices to perform a method. The method comprises detecting a bit error rate (BER) for each of a plurality of pins in a connector and comparing the BER for each pin to a threshold BER. Responsive to determining that a set of pins among the plurality of pins each have a BER that is above the threshold BER, the BER for each pin in the set of pins may be decreased by selecting a subset of pins among the plurality of pins and adjusting operational characteristics of one or more of the subset of pins, wherein the operational characteristics include a transmit power.

In some implementations, a method is provided. The method includes detecting a bit error rate (BER) for each of a plurality of pins in a connector and comparing the BER for each pin to a threshold BER. Responsive to determining that a set of pins among the plurality of pins each have a BER that is above the threshold BER, the BER for each pin in the set of pins may be decreased by selecting a subset of pins among the plurality of pins, and adjusting operational characteristics of one or more of the subset of pins. The operational characteristics include a transmit power.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, electronic devices (e.g., computing devices, network devices, etc.) may use various cards that include circuit boards and connectors. The connectors may be used to connect the cards to each other. A network device may include multiple cards (e.g., fabric cards, line cards, etc.) that are coupled to each other by one or more connectors.

As the capabilities of electronic devices and user demands on electronic devices (such as a switch chassis) increase, the number of cards and/or the number of components on the cards may increase. Connector pin density, routing layer density, and area on the cards (e.g., printed circuit boards) for connectors may be limiting factors in packaging density for these electronic devices. Data center switch chassis' may be upgraded by replacing them with a newer switch chassis. However, this requires large capitol and operational expenses. Alternatively, a switch chassis may be upgraded by replacing line cards within the switch chassis. For example, a customer operating at 25 gigabytes per second (using an mfc encoding scheme) may upgrade to operating at 56 gigabytes per second (using a QAM4 encoding scheme) by replacing the existing line cards with higher performance line cards. Some chassis' utilize a mid-plane configuration, with connectors on both ends of the mid-plane. However, use of a mid-plane can introduce interference at the connector pins at higher data rates. In switch chassis' utilizing such mid-plane configurations, replacing line cards to increase a data rate may result in larger amounts of interference from the mid-plane. Such interference may manifest in the form of channel irregularity and cross talk occurring among the pins of a connector. Channel irregularity is a function of the connectors and cards in a switch chassis and is not easily mitigated. Thus, reducing cross talk between channels in a connector is important for operating a switch chassis, particularly when using a mid-plane configuration. The BER of a connector pin, or channel, is an indicator of the health of the channel, and ultimately of the throughput chassis. Each pin on the connector may have a different BER that is affected by pins around it. BER may vary based on the interference caused by channel irregularity and cross talk.

Various implementations, embodiments, and examples described herein relate to a method and apparatus for tuning the pins of a connector to mitigate the effects cross talk, and thus solve multiple problems associated with the upgrade of switch chassis hardware to higher data rates and use of a mid-plane configuration.

Figure 1A:
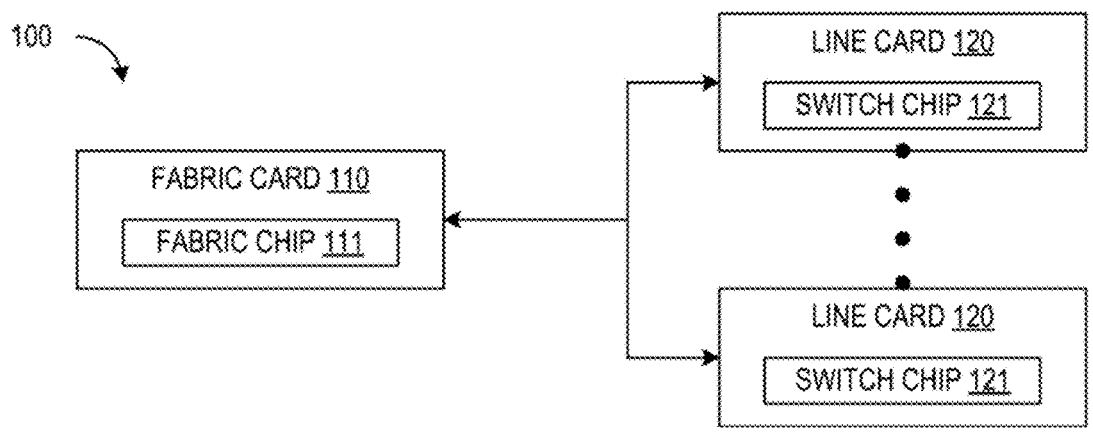
FIGS. 1A and 1B are block diagrams of a network device, in accordance with some embodiments of the present disclosure.
Figure 1B:
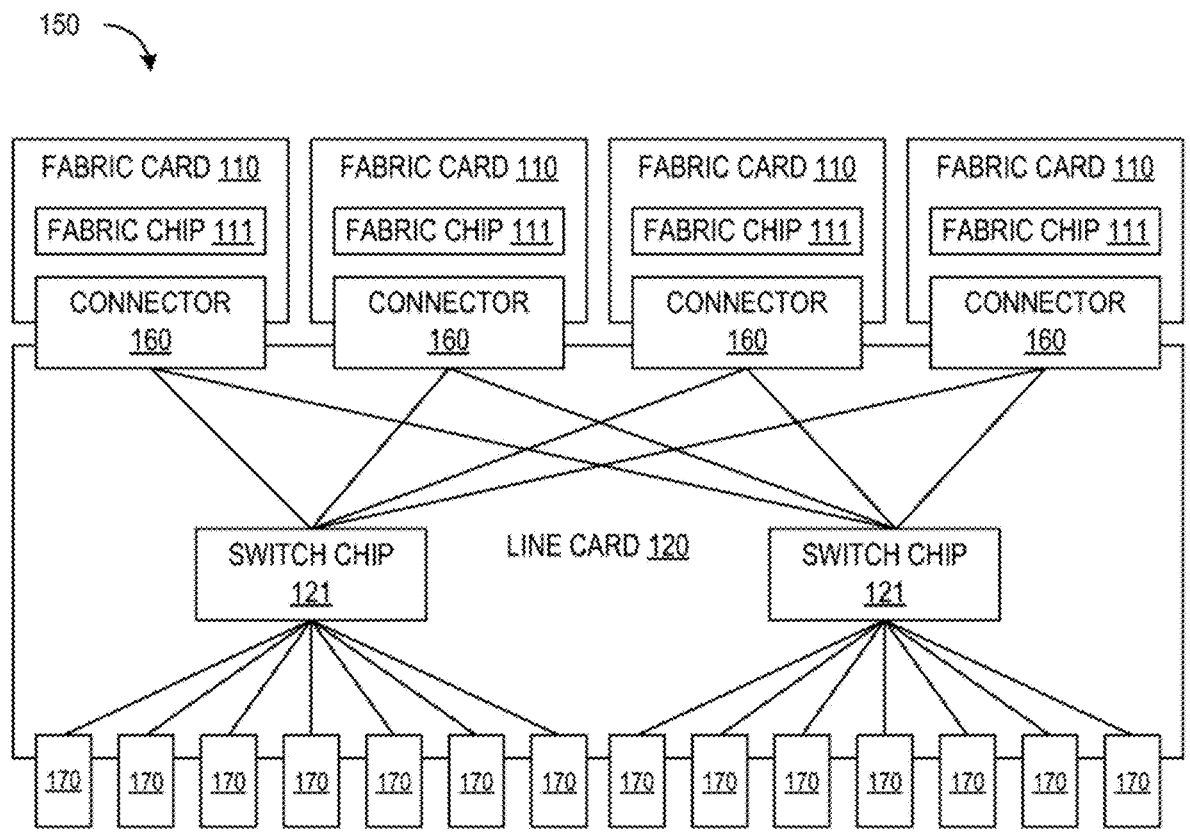

FIG. 1A is a block diagram of a network device 100, in accordance with some embodiments of the present disclosure. Examples of a network device may include a switch (e.g., a network switch), a router (e.g., a network router), a bridge (e.g., a network bridge), etc. The network device 100 includes a fabric card 110 and multiple line cards 120. The fabric card 110 includes a fabric processor 111. The fabric card 110 may communicatively be coupled to multiple line cards 120 via one or more connectors, as discussed in more detail below. Each of the line cards 120 includes a switch processor 121. The switches within the fabric processor 111 may be referred to as switching paths or routing paths. These switching paths or routing paths couple and/or connect ingress and egress ports of fabric processor 111 through the switch fabric in some embodiments. Although the fabric card 110 is illustrated with a fabric processor 111, the fabric card 110 may include a set of fabric processors 111 (e.g., multiple fabric processors 111, one or more fabric processors 111) in other embodiments. In addition, although the line card 120 is illustrated with a switch processor 121, the line card 120 may include a set of switch processors 121 (e.g., multiple switch processors 121, one or more switch processors 121) in other embodiments. The fabric processor 111 may be referred to as a fabric chip and the switching processor 121 may be referred to as a switching chip. The fabric processor 111 and switch processor 121 the may also be referred to as processing devices. A processing device may be a device that is capable of executing instructions to perform various operations, functions, tasks, etc. Examples of processing devices may include, a processor, a multi-core processor, a central processing unit (CPU), an application specific integrated circuit (ASIC), a field programmable gate array (FPGA), etc., FIG. 1B is a block diagram of a network device 150 (e.g., a switch, a router, etc.), in accordance with some embodiments of the present disclosure. The network device 100 includes fabric cards 110 and a line card 120. Each fabric card 110 includes a fabric processor 111. Each fabric card 110 may be communicatively coupled to the line card 120 via a respective connector 160, as discussed in more detail below. The switches within the fabric processor 111 may be referred to as switching paths or routing paths. These switching paths or routing paths couple and/or connect ingress and egress ports of fabric processor 111 through the switch fabric in some embodiments. The line card 120 includes two switch processors 121. The line card 120 also includes multiple front end connectors 170. The front end connectors 170 may be located on a front panel of the line card 120 such that the front end connectors 170 may be accessible when the line card 120 is inserted or installed into the network device 150 (e.g., into a chassis of the network device 150). The front end connectors 170 may be network interfaces or ports that may accept other devices. For example, the front end connectors 170 may accept small form-factor pluggable (SFP) modules, octal SFP (OSFP) modules, quad SFP (QSFP) modules, etc. In another example, the front end connectors 170 may be network interfaces such as Ethernet ports, optical fiber connectors, etc.

Although the fabric card 110 is illustrated with a fabric processor 111, the fabric card 110 may include a set of fabric processors 111 (e.g., one or more fabric processors 111) in other embodiments. In addition, although the line card 120 is illustrated with two switch processors 121, the line card 120 may include more switch processors 121 in other embodiments. The fabric processor 111 and switch processor 121 the may be referred to as processing devices, as discussed above. As illustrated in FIG. 1B, each switch processor 121 is communicatively coupled to a fabric card 110 via a respective connector 160. For example, the left switch processor 121 is coupled to the four fabric cards 110 via their respective connectors 160, and the right switch processor 121 is coupled to the four fabric cards 110 via their respective connectors 160. This allows each switch processor 121 to communicate data (e.g., transmit and/or receive packets, frames, messages, etc.) with each of the fabric processors 111. Connectors 160 can each include multiple connectors. For example, a connector 160 may include a first connector (e.g., a male connector) on a fabric card 110 and a second connector (e.g., a corresponding female connector) on the line card 120.

As discussed above, the line card 120 includes a circuit board and the switch processors 121 may be coupled to the circuit board. The circuit board may include fourteen routing layers (e.g., pins, lines, traces, wires, etc.) that couple the switch processors 121 to the front end connectors 170. The circuit board may also include eight other routing layers that couple the switch processors 121 to each of the fabric processors 111. Increasing the number of switch processors 121 and/or increase the number of front end connectors 170 may increase the number of routing layers. For example, if there are four switch processors 121 and twenty-eight front end connectors 170, a total of forty-four routing layers will be used to connect the switch processors 121 to the front end connectors 170 and the fabric processors. For example, twenty eight routing layers will be used to connect the four switch processors 121 to the front end connectors 170 and sixteen routing layers will be used to connector the four switch processors 121 to the four fabric processors 111. The more routing layers that are used in the line card, the thicker the circuit board should be in order to accommodate the routing layers. Increasing the number of routing layers will increase the thickness, cost and/or weight of the circuit board. Increasing the number of routing layers also increases the complexity of the layout of the routing layers. To accommodate the increase in routing layers, small vias (e.g., connections, pins, traces, wires, lines, etc., that go through the circuit board) may not be usable in order to maintain a proper ratio between the board thickness and the diameter of the vias. Using larger vias may decrease the number of routing layers that may be used in the circuit board. In addition, if too man routing layers are need, it may not be possible to include all of the routing layers within a circuit board.

Figure 2:
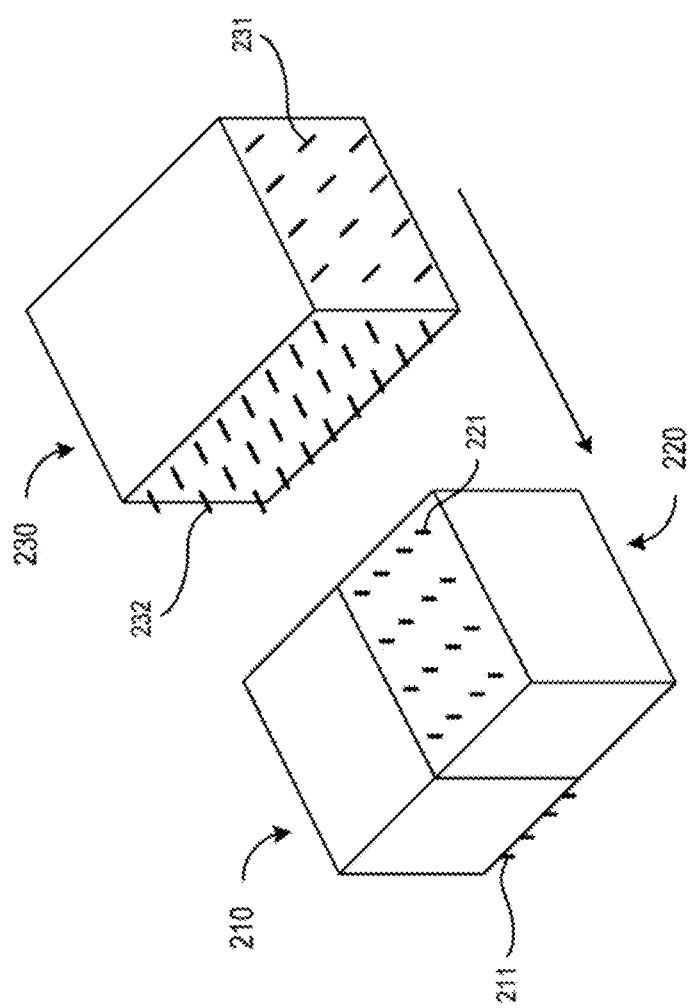
FIG. 2 is a perspective view of connectors, in accordance with some embodiments of the present disclosure.

FIG. 2 is a perspective view of connectors 210, 220, and 230, in accordance with some embodiments of the present disclosure. Connectors 210, 220 and 230 may be similar to connector 160 illustrated in FIG. 1B. As discussed herein, in some embodiments, connectors 210, 220, and 230 may together correspond to connector 160. Various orthogonal connectors are available from vendors, with various numbers of conductors, pins, pin layouts, sockets, pin receptacles, socket layouts, dimensions and relative orientations, and embodiments are not limited to the specific connectors shown herein. The conductors, pins, sockets, pin receptacles, etc., may also be referred to as connections. For example, a pin may be referred to as a connection. In another example, a socket or pin receptacle may be referred to as a connection.

As illustrated in FIG. 2, pins 232 (e.g., wires, lines, traces, etc.) of connector 230 (e.g., a male connector) may be inserted into sockets or pin receptacles of connectors 210 and 220 (e.g., female connectors). Connector 230 also includes solder pins 231 (e.g., wires, lines traces, etc.) which are perpendicular or orthogonal to pins 232. The solder pins 231 may be used to couple, connect, attach, etc., the connector 230 to a first circuit board (e.g., a printed circuit board (PCB)). Connector 210 includes solder pins 211 which are perpendicular in a downward direction to the pins 232 of the connector 230. The solder pins 211 may be used to couple, connect, attach, etc., the connector 210 to a second circuit board, as discussed in more detail below. Connector 220 includes solder pins 221 which are perpendicular in an upward direction to the pins 232 of the connector 230. The solder pins 221 may be used to couple, connect, attach, etc., the connector 220 to a third circuit board, as discussed in more detail below.

The connectors 210 and 220 may interface with each other when the connectors 210 and 220 mate with the connector 230. For example, a wall of the connector 210 may interface (e.g., come into contact with, align with, etc.) a wall of the connector 220. In another example, the two connectors 210 and 220 may be pushed, fitted, or interlocked together. In some embodiments, the connectors 210 and 220 may be orthogonal to the connector 230. For example, the first circuit board (coupled to connector 230) may be orthogonal or perpendicular to the first circuit board (coupled to connector 210), as discussed in more detail below. The first circuit board (coupled to connector 230) may also be orthogonal or perpendicular to the second circuit board (coupled to connector 220), as discussed in more detail below. Thus, the connectors 210 and 220, and the connector 230 may be referred to as orthogonal connectors.

Orthogonal connectors may have a specific handedness or orientation of orthogonality (e.g., as keyed), or may have one connector rotatable with respect to the other connector. It should be appreciated that the mating or engagement of connectors 210 and 220, and connector 230 may utilize any suitable orientation that results in the orthogonal orientation discussed herein. In one embodiment, the first circuit board and the second circuit board would meet each other edge to edge, with the edge of the first circuit board adjacent and perpendicular to the edge of the second circuit board, rather than edge to face as is the case with orthogonal board connectors, e.g., that position one circuit board perpendicular and coupled to a central region of a face of another circuit board. The first circuit board and the third circuit board would also meet each other edge to edge, with the edge of the first circuit board adjacent and perpendicular to the edge of the second circuit board.

In one embodiment, the second circuit board may be orthogonal to the first circuit board at a 90 degree angle when the connector 210 is mated or coupled to the connector 230. The third circuit board may be orthogonal to the first circuit board at a 270 degree angle when the connector 220 is mated or coupled to the connector 230. In some embodiments, the connector 230 may be part of a mid-plan or a fabric card, as discussed in more detail below. In other embodiments, the connectors 210, 220, and 230 may include housings, as discussed in more detail below.

The term "connector" is understood to apply to a large variety of connectors with a large variety of numbers of conductors, and to groups of connectors, individual connectors, and components of a connector. For example, a male plug having one or more pins or prongs is considered a connector, a female socket having one or more pin or prong receptacles or socket contacts is considered a connector, and the combination of a male plug and female socket is a connector, as are hermaphrodite connectors and their components. Groups of multiple male connectors are considered a connector, as are groups of female connectors, and groups of hermaphrodite connectors. Connections to a connector can be made for example by crimping, soldering (pins or surface mount), or fastening, and can be made by wires, printed circuit board pads, plated through holes, edges or traces, or other connectors among various possibilities.

Figure 3A:
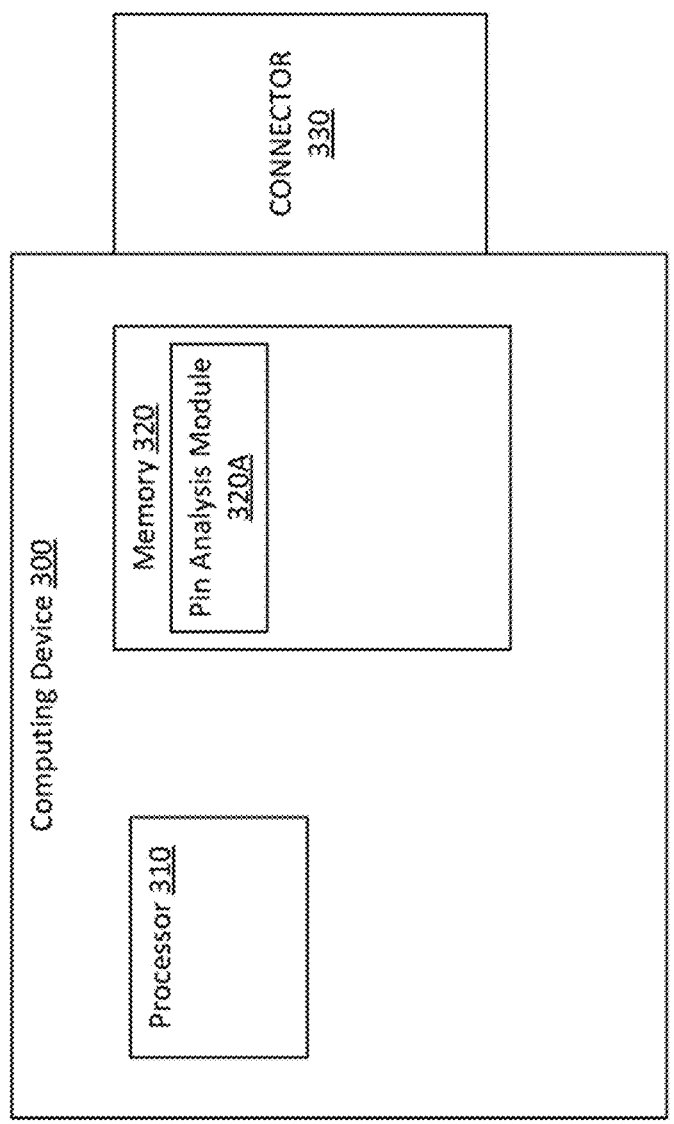
FIG. 3A is a block diagram of a computing device, in accordance with some embodiments of the present disclosure.

FIG. 3A illustrates a computing device 300, in accordance with various embodiments of the present disclosure. Computing device 300 may be a line card or a fabric card, such as fabric card 110 and line cards 120 illustrated in FIG. 1A. Computing device 300 may include processor 310 and memory 320. In addition, computing device 300 may include connector 330, which may be removably coupled to computing device 300 and may connect computing device 300 to another computing device or, in some embodiments, a mid-plane. In some embodiments, memory 320 may be a non-volatile memory. A non-volatile memory may be a device that is capable of storing data, where the data remains stored and/or accessible even if the non-volatile memory loses power, is reset, etc. For example, memory 320 may be a flash memory, a hard disk, a disk drive, a flash chip, etc. The memory 320 may alternatively be a volatile memory. A volatile memory may be a device that is capable of storing data, where the data is lost or no longer accessible if the non-volatile memory loses power, is reset, etc. For example, memory 320 may be a random access memory (RAM) that loses data if power is no longer supplied to the RAM. The memory 320 may include pin analysis module 320A, which may be executed by processor 310 to perform the embodiments described herein with respect to FIGS. 3A-3D and 4. Although illustrated as a software module stored in memory 320, pin analysis module 320 may be implemented as firmware in processor 310. In some embodiments, pin analysis module 320 may be separate from the processor 310 (e.g., may be a separate circuit, field programmable gate array (FPGA), application specific integrated circuit (ASIC), a process running on another processing device, etc.)

Figure 3B:
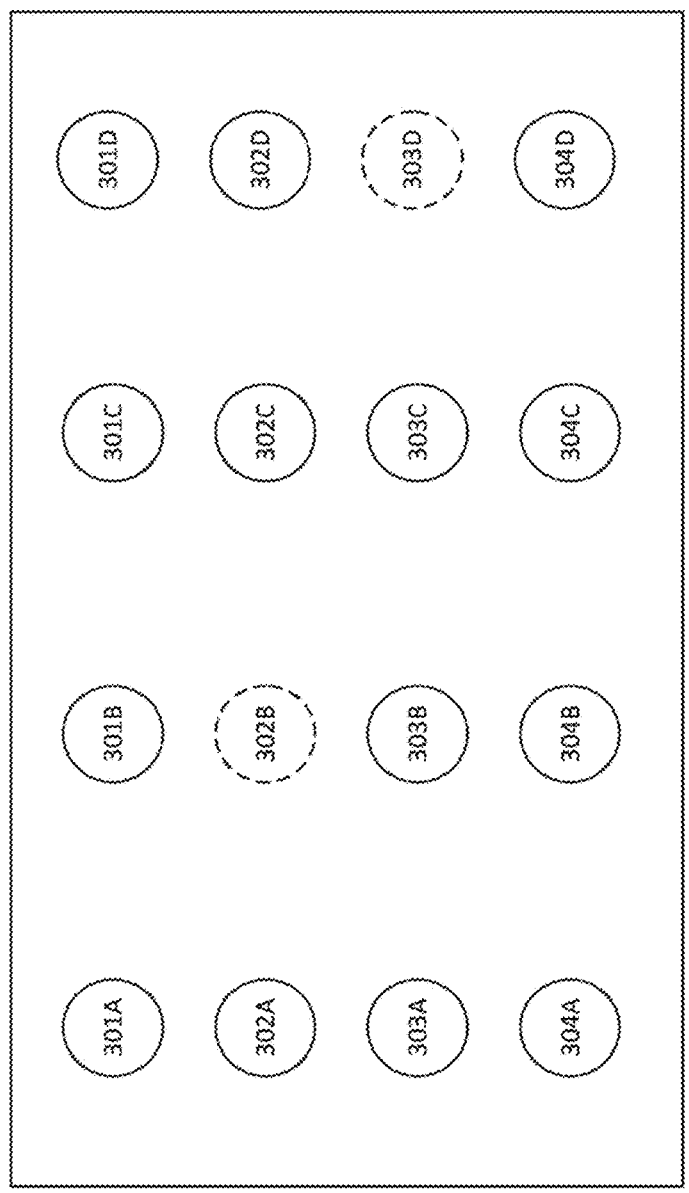
FIGS. 3B-3D are front views of an example connector, in accordance with some embodiments of the present disclosure.

FIG. 3B is a front view of a connector 330 in accordance with some embodiments of the present disclosure. Connector 330 may be similar to connector 160 illustrated in FIG. 1B and connector 230 illustrated in FIG. 2. Upon power up or during operation of computing device 300, processor 310 may execute pin analysis module 320A to perform the functions described with respect to FIGS. 3B and 3C so as to ensure that each of the pins has a BER below a threshold BER, thereby reducing cross talk. The threshold BER may be pre-defined based on a desired data rate. For example, as the desired data rate increases, the threshold BER may decrease. In some embodiments, the threshold BER may also be based in part on insertion loss parameters describing what each channel's frequency response should look like. For example, the threshold BER may be based in part on the S21 insertion loss parameters specified by the IEEE™.

Processor 310 may calculate BER for each pin by transmitting a known bit stream through the pin, detecting the bit stream at the pin output and determining whether any bits are different from the originally transmitted bit stream. Processor 310 may then divide the number of errors (bits that are different from how they were originally transmitted) and divide by the time taken to detect the bit stream at the pin output to get the BER for that pin. In some embodiments, processor 310 may calculate the BER by comparing a checksum of the known bit stream to the bit stream detected at the pin output. Any other appropriate method for calculating BER may be used by the processor 310. The processor 310 may initially detect the BER of each pin and compare the BER of each pin with the threshold BER. Processor 310 may determine a set of pins that have a BER that is greater than the threshold BER. In the example illustrated in FIG. 3B, processor 310 may determine that pins 302B and 303D have a BER above the threshold as indicated by the dashed lines. Upon determining that pins 302B and 303D have a BER above the threshold, processor 310 may commence a process of adjusting the BER for those pins by adjusting one or more operational characteristics of one or more of the pins 301A-304D as described in further detail herein. The operational characteristics may include transmit power and inter symbol interference (ISI) offset parameters, among others. More specifically, for pin 302B, processor 310 may select a subset of the pins 301A-304D and adjust the transmit power of one or more pins in the subset, so as to decrease the BER of pin 302B. The pins that are in proximity to pin 302B may transmit and receive signals, and in the process may generate unwanted effects/interference on pin 302B (known as cross talk). Such interference can be caused by undesired capacitive, inductive, or conductive coupling from one pin to another. Thus, processor 310 may select a subset of pins that include pins that are most likely to be causing cross talk on pin 302B. In some embodiments, processor 310 may select pin 302B and each pin surrounding it (i.e. 301A-301C, 302A, 302C and 303A-303C) as the subset. In other embodiments, processor 310 may select pin 302B and each pin in the same row as it (i.e. pins 302A, 302C and 302D) as the subset. Processor 310 may then adjust the transmit power of one or more of the pins in the subset. In some embodiments, processor 310 may identify one or more pins in the subset having the lowest BER and adjust the transmit power of those pins as described in further detail herein. For example, processor 310 may increase the transmit power of the pin 302B. Alternatively, processor 310 may decrease the transmit power of one or more pins in the subset except pin 302B. In other embodiments, processor 310 may increase the transmit power of the pin 302B while simultaneously decreasing the transmit power of each pin in the subset except pin 302B.

Processor 310 may then select a subset of the pins (301A-304D) for pin 303D and adjust the transmit power of one or more pins in that subset, so as to decrease the BER of pin 303D. Processor 310 may select the subset for pin 303D in the same manner as with pin 302B. In some embodiments, processor 310 may select pin 303D and each pin surrounding it (i.e. 302C, 302D, 303C, 304C and 304D) as the subset. In other embodiments, processor 310 may select pin 302B and each pin in the same row as it (i.e. pins 303A-303C) as the subset. Processor 310 may then adjust the transmit power of one or more of the pins in the subset in order to decrease the BER of pin 303D. In some embodiments, processor 310 may identify one or more pins in the subset having the lowest BER among pins in the subset and adjust the transmit power of those pins. For example, processor 310 may increase the transmit power of the pin 303D. Alternatively, processor 310 may decrease the transmit power of one or more pins in the subset except pin 303D. In other embodiments, processor 310 may increase the transmit power of the pin 303D while simultaneously decreasing the transmit power of each pin in the subset except pin 303D.

In some embodiments, upon performing the adjustment process for pins 302B and 303D (i.e. each pin in the set of pins that have a BER lower than the threshold) with respect to transmit power, processor 310 may adjust the ISI offset parameters of one or more of pins 301A-304D. The channel characteristics of each pin 301A-304D may cause neighboring bits in a bit stream to interfere with each other, a phenomenon known as inter-symbol interference (ISI). In some embodiments, processor 310 may adjust the ISI parameters of pins 302B and 303D. In other embodiments, processor 310 may iteratively adjust the ISI parameters of each pin 301A-304D. Instill other embodiments, processor 310 may select a subset of the pins 301A-304D as described above and iteratively adjust the ISI parameters of those pins. In adjusting the ISI parameters of a pin, processor 310 may examine the current bit that the pin is about to output, the bit that was most recently output, and the bit that will be output after the current bit is output. Processor 310 may determine the extent to which the current bit is being interfered with by the bit that was most recently output and determine a scalar factor representing the interference (e.g., 0.2). Thus, processor 310 may apply an adjustment with a scalar factor of 0.2 to compensate for the ISI the current bit is experiencing as a result of the bit that was most recently output. In addition, if processor 310 determines that the current bit is also experiencing ISI with a scalar factor of 0.4 as a result of the bit that will be output after the current bit, processor 310 may also apply an adjustment with a scalar factor of 0.4 to compensate for the ISI the current bit is experiencing as a result of the bit that will be output next after the current bit.

Upon performing the adjustment process for pins 302B and 303D (i.e. each pin in the set of pins that have a BER lower than the threshold) processor 310 may detect the BER of each pin 301A-304D for a second time. If each pin 301A-304D has a BER below the threshold BER, then processor 310 may determine that the BER of all the pins in the connector has been optimized to reduce cross talk.

Figure 3C:
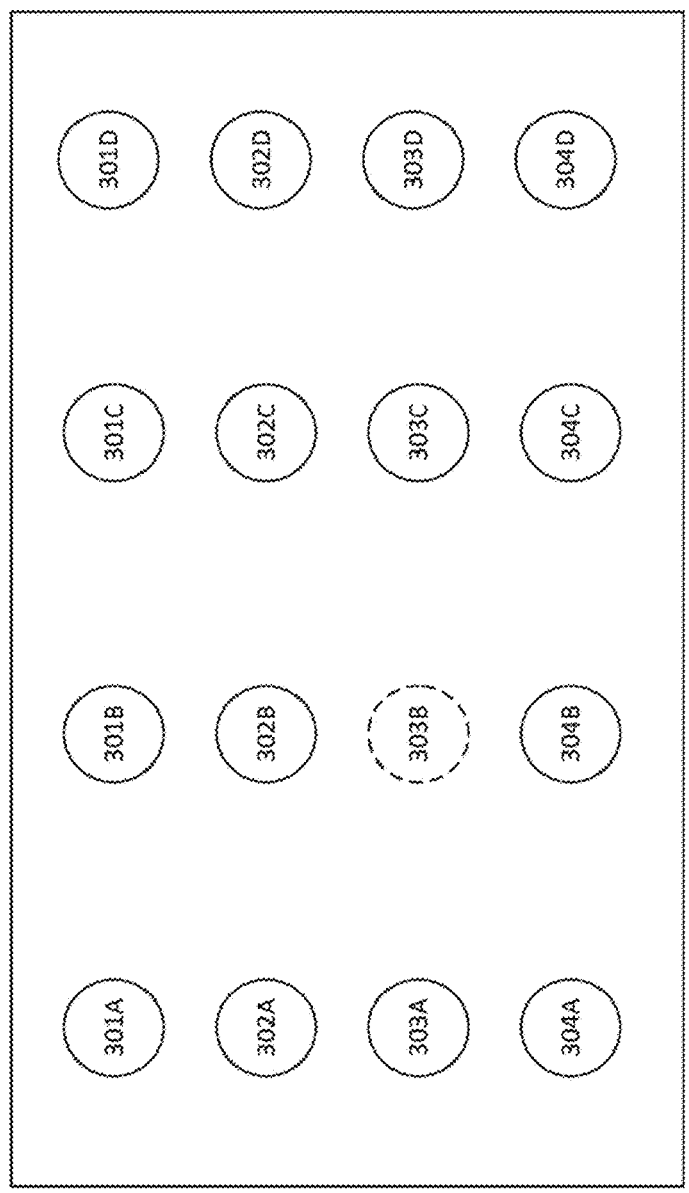

However, processor 310 may determine that certain pins among pins 301A-304D still have a BER above the threshold BER. This may be a result of the adjustment process carried out for pins 302B and 303D causing the BER of other pins among the pins 30A-304D to have risen above the threshold. For example, if processor 310 increased the transmission power of pin 302B (thereby decreasing its BER), this may cause the BER of pin 303B to rise above the threshold BER. FIG. 3C illustrates the connector 330 after processor 310 has determined the BER of each pin 301A-304D for the second time. FIG. 3C shows that although pins 302B and 303D now have BERs below the threshold BER, the BER of pin 303B has risen above the threshold BER (as indicated by the dashed line). As a result, processor 310 may perform another iteration of the adjustment process described above. More specifically, for pin 303B, processor 310 may select a subset of the pins 301A-304D and adjust the operational characteristics of one or more pins in the subset, so as to reduce the BER of pin 303B. In some embodiments, processor 310 may select 303B and each pin surrounding it (i.e. 302A-302C, 303A, 303C and 304A-304C) as the subset. In other embodiments, processor 310 may select pin 303B and each pin in the same row as it (i.e. pins 303A, 303C and 303D) as the subset. Processor 310 may then adjust the power of one or more of the pins in the subset. In some embodiments, processor 310 may identify one or more pins in the subset having the lowest BER among pins in the subset and adjust the operational characteristics of those pins. For example, processor 310 may increase the transmit power of the pin 303B. Alternatively, processor 310 may decrease the transmit power of each pin in the subset except pin 303B. In other embodiments, processor 310 may increase the transmit power of the pin 303B while simultaneously decreasing the transmit power of each pin in the subset except pin 303B. In some embodiments, upon performing the adjustment process for pin 303B with respect to transmit power, processor 310 may then adjust the ISI parameters for pin 303B. Processor 310 may then detect the BER of each pin 301A-304D for a third time. In this way, processor 310 may iteratively continue the adjustment process until each pin 301A-304D has a BER that is below the threshold BER.

Figure 3D:
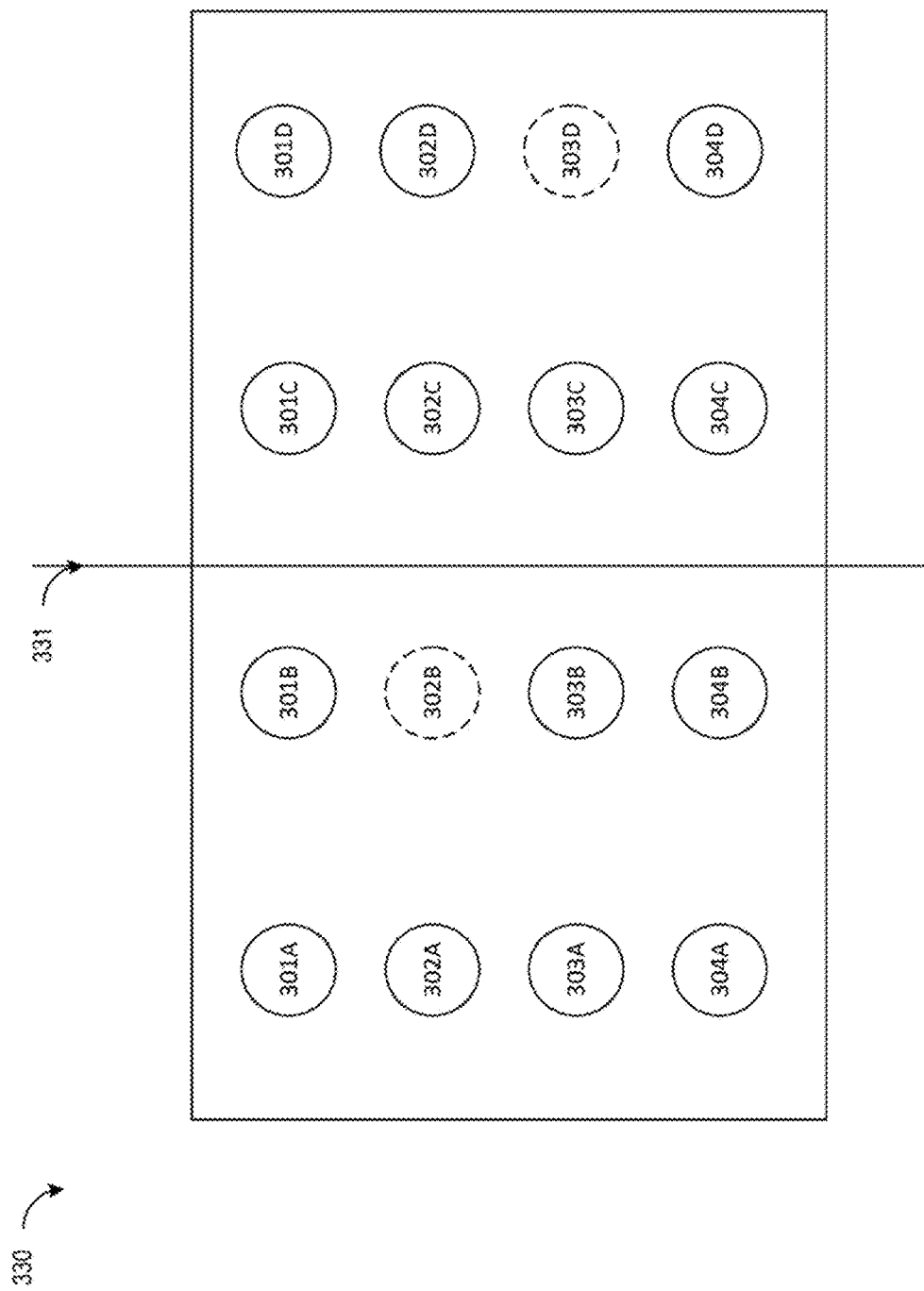

FIG. 3D illustrates a front view of connector 330 in an embodiment where the connector 330 includes a ground plane 331. Upon power up or during operation of computing device 300, processor 310 may execute pin analysis module 320A to perform the operations described with respect to FIG. 3D so as to ensure that each of the pins has a BER below the threshold BER. The processor 310 may initially detect the BER of each pin and compare the BER of each pin with the threshold BER. Processor 310 may determine a set of pins that have a BER that is greater than the threshold. In the example illustrated in FIG. 3D, processor 310 may determine that pins 302B and 303D have a BER above the threshold as indicated by the dashed lines. Upon determining that pins 302B and 303D have a BER that is greater than the threshold, processor 310 may commence an operational characteristic adjustment process as discussed with respect to FIGS. 3B and 3C. More specifically, for pin 302B, processor 310 may select a subset of the pins 301A-304D and adjust the transmit power of one or more pins in the subset, so as to bring down the BER of pin 302B. In some embodiments, processor 310 may select pin 302B and each pin surrounding it to the left of the ground plane 331 (i.e. 301A-301B, 302A, and 303A-303B) as the subset. Pins 301C, 302C, and 303C are separated from pin 302B by the ground plane, and thus cannot affect the BER of pin 302B. As a result, only pins on the same side as pin 302B may be included in the subset. In other embodiments, processor 310 may select pin 302B and each pin in the same row as it (i.e. pin 302A) as the subset. Processor 310 may adjust the transmit power of one or more pins in the subset to decrease the BER of pin 302B. In some embodiments, processor 310 may identify one or more pins in the subset having the lowest BER among pins in the subset and adjust the operational characteristics of those pins. For example, processor 310 may increase the transmit power of the pin 302B. Alternatively, processor 310 may decrease the transmit power of each pin in the subset except pin 302B. In other embodiments, processor 310 may increase the transmit power of the pin 302B while simultaneously decreasing the transmit power of each pin in the subset except pin 302B. Processor 310 may perform this process for pin 303D as well. In some embodiments upon performing the adjustment process for pins 302B and 303D with respect to transmit power, processor 310 may then adjust the IS parameters of pins 302B and 303D. Processor 310 may continue the above described process on an iterative basis until each of the pins 301A-304D has a BER below the threshold BER.

Figure 4:
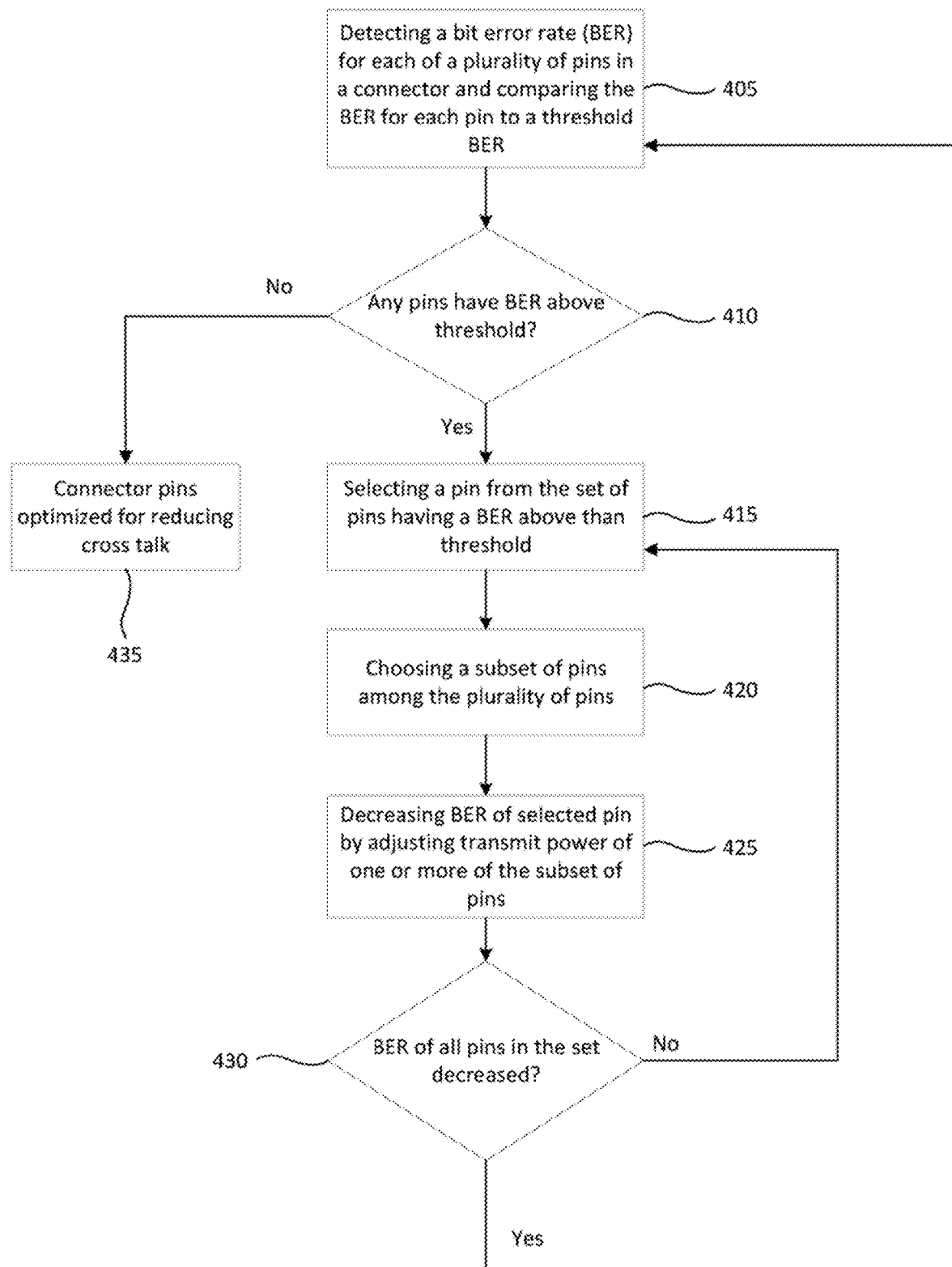
FIG. 4 is a flow diagram of a method of reducing cross talk among pins in a connector, in accordance with some embodiments of the present disclosure.

FIG. 4 illustrates a method 400 for optimizing the pins in a connector, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 300 illustrated in FIG. 3).

At block 405, computing device 300 may detect a bit error rate (BER) for each of a plurality of pins in a connector and compare the BER for each pin to a threshold BER. At block 410, computing device 300 may determine whether any pins among the plurality of pins have a BER that is above a threshold BER. If not, then at block 435 computing device may determine that the pins in the connector are now optimized to reduce cross talk. If computing device 300 does determine that there are pins with a BER above the threshold, then computing device 300 may identify those pins having a BER that is above than the threshold BER (i.e. identify a set of pins having a BER that is above than the threshold BER). At block 415, computing device 300 may select a pin from the set of pins and choose a subset of pins from the plurality of pins for the chosen pin. As discussed above, the subset of pins may include the selected pin and each pin adjacent to it. In other embodiments, the subset of pins may include the selected pin and each pin in the same row as it. At block 425, computing device 300 may adjust the transmit power of one or more of the subset of pins, thereby increasing the BER of the selected pin. In some embodiments, computing device 300 may identify one or more pins in the subset having the lowest BER among pins in the subset and adjust the operational characteristics of those pins. For example, computing device 300 may increase the transmit power of the selected pin. Alternatively, computing device 300 may decrease the transmit power of each pin in the subset except the selected pin. In other embodiments, processor 310 may increase the transmit power of the selected pin while simultaneously decreasing the transmit power of each pin in the subset except the selected pin. At block 430, computing device may determine if the BER of all pins in the set of pins has been decreased. If not, then computing device 300 may proceed to block 415 where it may select the next pin from the set of pins having a BER less than the threshold BER and perform the same adjustment process. Computing device 300 may proceed in this way until each the BER of each pin in the set of pins has been decreased. If at block 430 computing device 300 determines that the BER of all of the pins in the set of pins has been decreased, then it may proceed to block 405 where it may detect the BER for each of the plurality of pins in the connector. In some embodiments, upon performing the adjustment process for each pin in the set of pins with respect to transmit power, computing device 300 may adjust the ISI parameters of each pin in the set of pins before proceeding to block 405. At block 410 computing device 300 may determine if any of the plurality of pins has a BER that is above the threshold BER. Computing device may continue iteratively in this manner until the BER of each pin in the plurality of pins is less than the threshold BER.

Figure 5:
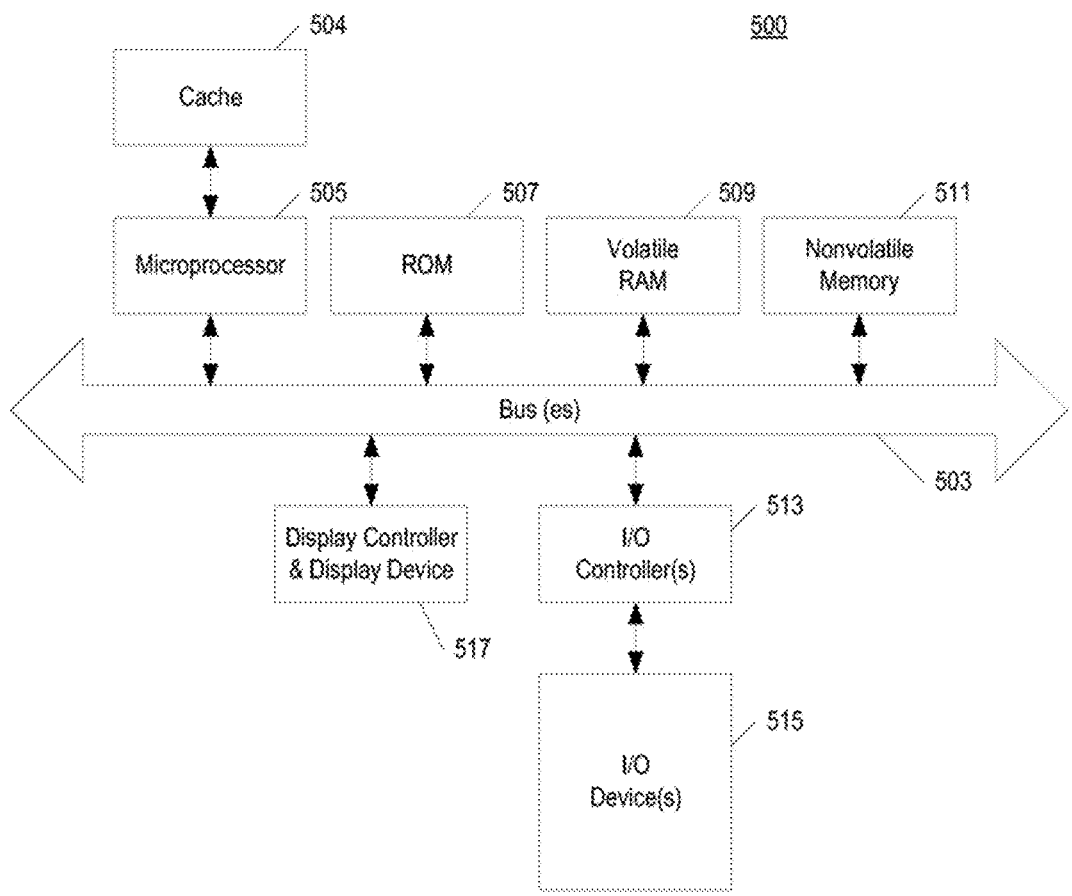
FIG. 5 is a block diagram of an example computing device, in accordance with some embodiments of the present disclosure.

FIG. 5 shows an example a computing device 500, in accordance with some embodiments of the present disclosure. For example, the computing device 500 may be implemented including a network device 100 as shown in FIG. 1. Note that while FIG. 5 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 5, the computing device 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 517 and to peripheral devices such as input/output (I/O) devices which may be mice, keyboards, modems, network interfaces, printers and other devices which are well known in the art. In one embodiment, the computing device 500 includes a plurality of network interfaces of the same or different type (e.g., Ethernet copper interface, Ethernet fiber interfaces, wireless, and/or other types of network interfaces). In this embodiment, the computing device 500 can include a forwarding engine to forward network data received on one interface out another interface.

Typically, the input/output devices 515 are coupled to the system through input/output controllers 513. The volatile RAM (Random Access Memory) 509 is typically implemented as dynamic RAM (DRAM), which requires power continually in order to refresh or maintain the data in the memory.

The mass storage 511 is typically a magnetic hard drive or a magnetic optical drive or an optical drive or a DVD ROM/RAM or a flash memory or other types of memory systems, which maintains data (e.g., large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that descriptions of direction and orientation are for convenience of interpretation, and the apparatus is not limited as to orientation with respect to gravity. In other words, the apparatus could be mounted upside down, right side up, diagonally, vertically, horizontally, etc., and the descriptions of direction and orientation are relative to portions of the apparatus itself, and not absolute.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA, an ASIC, or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   detecting a bit error rate (BER) for each of a plurality of pins in a connector and comparing the BER for each pin to a threshold BER; and
   responsive to determining that a set of pins among the plurality of pins each have a BER that is above the threshold BER, decreasing, for each pin in the set of pins, the BER by:
   selecting a subset of pins among the plurality of pins; and
   adjusting a transmit power of one or more pins of the selected subset of pins.

2. The method of claim 1, wherein the decreasing is performed iteratively until none of the plurality of pins have a BER that is above the threshold BER.

3. The method of claim 1, wherein the selected subset of pins includes a particular pin and each pin of the plurality of pins adjacent to the particular pin.

4. The method of claim 1, wherein the selected subset of pins includes a particular pin and each pin that is in a same row of the connector as the particular pin.

5. The method of claim 1, wherein adjusting the transmit power comprises adjusting the transmit power of one or more pins in the subset having a lowest BER among pins in the subset.

6. The method of claim 1 further comprising selecting a pin from among the subset of pins, and wherein adjusting the transmit power comprises decreasing the transmit power of one or more pins in the selected subset of pins other than the selected pin.

7. The method of claim 1 further comprising selecting a pin from among the subset of pins, and wherein adjusting the transmit power comprises increasing the transmit power of the selected pin.

8. The method of claim 1 further comprising selecting a pin from among the subset of pins, and wherein adjusting the transmit power comprises increasing the transmit power of the selected pin while simultaneously decreasing the transmit power of one or more pins in the selected subset of pins other than the selected pin.

9. An apparatus comprising:
   a connector having a plurality of pins;
   a memory; and
   a processor configured to:
   detect a bit error rate (BER) for each of a plurality of pins in a connector and compare the BER for each pin to a threshold BER; and
   responsive to determining that a set of pins among the plurality of pins each have a BER that is above the threshold BER, decrease, for each pin in the set of pins, the BER by:
   selecting a subset of pins from among the plurality of pins; and
   adjusting a transmit power of one or more pins in the selected subset of pins.

10. The apparatus of claim 9, wherein the processor is configured to perform the adjusting iteratively until none of the plurality of pins have a BER that is above the threshold BER.

11. The apparatus of claim 9, wherein to select the subset of pins from among the plurality of pins, the processor is configured to select one of the pins in the set of pins and to select each pin of the plurality pins that is adjacent to the selected one of the pins in the set of pins.

12. The apparatus of claim 9, wherein to select the subset of pins from among the plurality of pins, the processor is configured to select one of the pins in the set of pins and to select each pin of the plurality of pins that is in a same row of the connector as the selected one of the pins in the set of pins.

13. The apparatus of claim 9, wherein to adjust the transmit power the processor is configured to adjust the transmit power of one or more pins in the subset having a lowest BER among the pins in the subset of pins.

14. The apparatus of claim 9, wherein to adjust the transmit power the processor is configured to decrease the transmit power of one or more pins in the selected subset other than a selected one of the pins in the selected subset of pins.

15. The apparatus of claim 9, wherein to adjust the transmit power the processor is configured to increase the transmit power of a selected one of the pins in the selected subset of pins.

16. The apparatus of claim 9, wherein to adjust the transmit power the processor is configured to increase the transmit power of a selected one of the pins in the subset of pins while simultaneously decreasing the transmit power of one or more pins in the subset of pins other than the selected one of the pins in the subset of pins.

17. A non-transitory computer-readable medium having executable instructions to cause one or more processing devices to perform a method, the method comprising:

detecting a bit error rate (BER) for each of a plurality of pins in a connector and comparing the BER for each pin to a threshold BER; and responsive to determining that a set of pins among the plurality of pins each have a BER that is above the threshold BER, decreasing, for each pin in the set of pins, the BER by:

selecting a subset of pins from among the plurality of pins; and adjusting a transmit power of one or more pins in the selected subset of pins.

18. The non-transitory computer-readable medium of claim 17, wherein the adjusting is performed iteratively until none of the plurality of pins have a BER that is below the threshold BER.

19. The non-transitory computer-readable medium of claim 17, wherein the selected subset of pins includes a particular pin and each pin of the plurality of pins adjacent to the particular pin.

20. The non-transitory computer-readable medium of claim 17, wherein adjusting the transmit power comprises increasing the transmit power of a selected one of the pins in the subset of pins while simultaneously decreasing the transmit power of one or more pins in the subset other than the selected one of the pins in the subset of pins.

\* \* \* \* \*